C. E. MORSE.
AXLE CLUTCH.
APPLICATION FILED FEB. 1, 1915.

1,179,550. Patented Apr. 18, 1916.
2 SHEETS—SHEET 1.

WITNESSES:
Edward A. Breed,
Blanche C. Chartier.

INVENTOR,
Charles E. Morse,
BY
Allen & Daggett
ATTORNEYS

C. E. MORSE.
AXLE CLUTCH.
APPLICATION FILED FEB. 1, 1915.
1,179,550.
Patented Apr. 18, 1916.
2 SHEETS—SHEET 2.
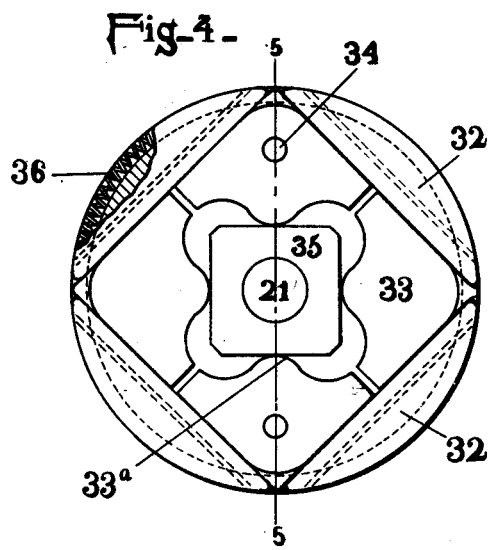
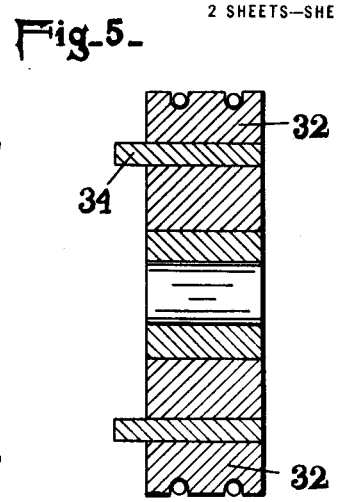
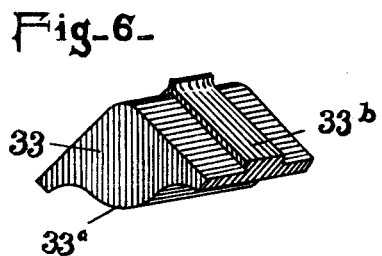
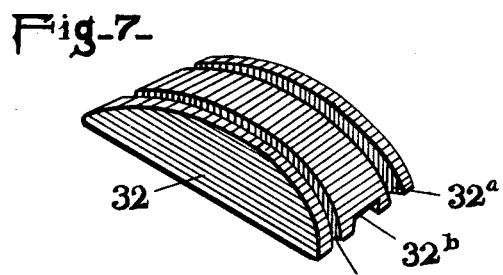
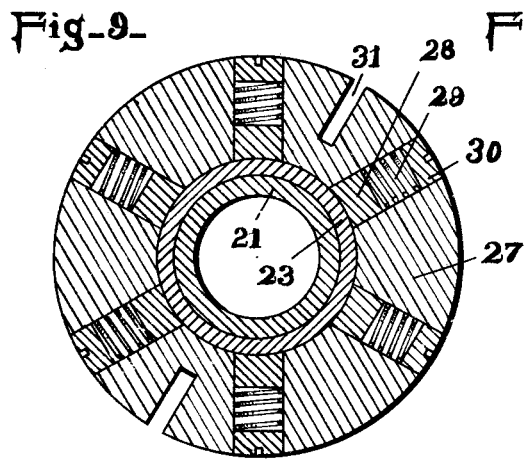
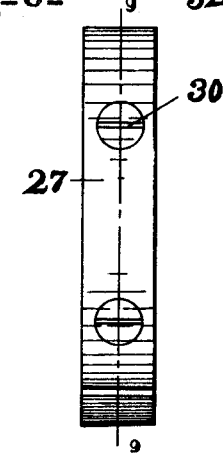
WITNESSES:
Edward A. Breed,
Blanche C. Chartier.
INVENTOR,
Charles E. Morse,
BY Allen & Daggett,
ATTORNEYS

UNITED STATES PATENT OFFICE.

CHARLES E. MORSE, OF SOMERVILLE, MASSACHUSETTS, ASSIGNOR TO EZRA RAYMOND MORSE, OF SOMERVILLE, MASSACHUSETTS.

AXLE-CLUTCH.

1,179,550.  Specification of Letters Patent.  Patented Apr. 18, 1916.

Application filed February 1, 1915. Serial No. 5,343.

*To all whom it may concern:*

Be it known that I, CHARLES E. MORSE, a citizen of the United States, residing at Somerville, in the county of Middlesex and State of Massachusetts, have invented a certain new and useful Axle-Clutch, of which the following is a specification, reference being had to the accompanying drawings.

This invention relates particularly to axle clutches for the driving wheels of automobiles, and my immediate object is to dispense with the more or less intricate and expensive differential gearing now commonly used and to substitute therefor simple, and reasonably cheap, clutch mechanism contained mainly in the hubs of the said wheels; said substitute being of such a construction that the wheels are free to rotate independently of each other the instant that the power is shut off, or whenever the wheels, or either of them, run ahead of the driving shaft as, for example, in traversing a curve.

My said invention is clearly illustrated in the annexed drawings in which—

Figure 1:
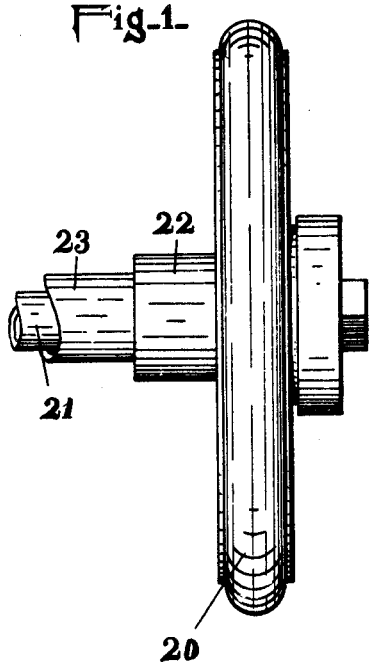
Figure 2:
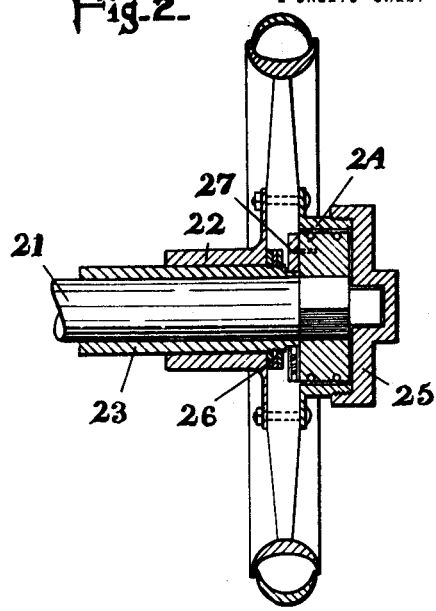
Figure 3:
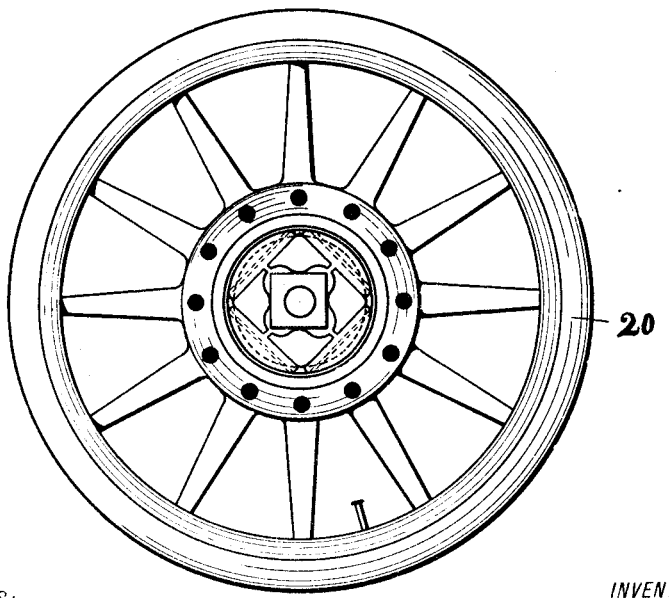

Figure 1 is a side view of an automobile wheel and shaft embodying my present improvement and Fig. 2 is, mainly, a central longitudinal sectional view of the same. Fig. 3 is an outer end view of the same with the protective cap 25 removed. Fig. 4 is a relatively enlarged, detached, face view of an expanding ring or clutch member which constitutes an important element of my improvement and Fig. 5 is a sectional view of the same taken on the line 5—5 of said Fig. 4. Fig. 6 is a perspective view of one of the clutch members 33 and Fig. 7 is a perspective view of one of the clutch members 32. Fig. 8 is an edge view of the friction ring 27 and Fig. 9 is a sectional view of the same taken on the line 9—9 of said Fig. 8.

Referring to these drawings, the numeral 20 indicates a vehicle wheel as a whole, and 21 indicates a driven shaft which, we will assume, is the rear shaft of an automobile and is suitably connected with an engine, in such manner that the said shaft may be rotated in either direction, or may be stopped at will. The hub 22 of the wheel is elongated as seen in Figs. 1 and 2 and is of such size that a sleeve, or housing, 23 may be interposed between the extended hub and the shaft 21. On the outer face of the wheel is secured a collar 24 which serves as the ring member of a friction clutch and upon said collar 24 is screwed a protective cap 25. The sleeve 23 is held against endwise movement in one direction by a nut, a check-nut and a washer shown at 26, the nut and the check-nut being screwed upon the threaded end of said sleeve, as will be understood by reference to Fig. 2 of the drawings. The inner end portion of the said sleeve or housing is shouldered down, as seen in said Fig. 2, and upon this shouldered down portion is mounted a friction collar 27 that is illustrated on a larger scale in Figs. 8 and 9, to which figures reference is now made. Said collar is drilled radially to provide a plurality of holes in which are loosely located plugs 28 which abut the sleeve 23 when the parts are assembled; the plugs 28 being forced into frictional engagement with the sleeve by springs 29 which are backed by screws 30, the construction being such that the springs may be compressed, in order to increase the frictional contact of plugs 28 with the sleeve 23, by simply turning the screws 30 home in the said radial holes. The collar 27 is also provided with one or more openings 31, here shown as radial slots, for a specific purpose which I will refer to shortly.

Located within the clutch ring 24 is an expansible, compound, clutch which includes, as here shown, four shoes 32 whose united circumferential surfaces are of such size that they will fit easily within the said clutch-ring 24, the inner faces of said shoes being flattened so as to provide, when assembled, a square opening in which are located four expanding blocks 33, two of which blocks have projecting therefrom studs 34 which are adapted to enter the openings 31 in the friction ring 27. The inner edges or face portions of the expanding blocks 33 are cut away to provide central projections 32ᵃ which engage the flat sides of a square block 35 which prevents the blocks 33 and shoes 32 from collapsing and also serves as a spreader for the blocks and shoes when it is desired to clutch the wheel to the driving shaft; the spreader 35 being fixedly secured to, and therefore adaptable to rotate with the shaft 21.

Normally, the clutch mechanism is inoperative, that is to say, when the shaft is not in rotation, the wheel may be rotated readily in either direction and this is also the fact if the wheel is rotated so rapidly that it runs ahead of the shaft. When, however, the vehicle is being power driven along a practically straight course, the friction resulting from the engagement of plugs 28 with the sleeve 23 operates to retard the disk 27 and the connected expanding blocks 33 and so that the spreader block 35, in seeking to rotate with the driving shaft, will engage the projections 33ᵃ with sufficient force to move the blocks 33 and the shoes 32 outward until the said shoes engage the inner face of the clutch ring 24 with sufficient frictional force to rotate the wheel 20. So soon as the shaft 21 and the spreader block 35 are stopped the shoes 32 and blocks 33 are returned to their normal (inoperative) positions by springs 36 which encircle the shoes 32 and are, by preference, located in annular grooves 32ᵃ formed in the said shoes (see Figs. 4 and 7).

In order to guard against the accidental disarrangement of the shoes 32 with respect to the expanding blocks 33, I have provided in the inner (straight) faces of said shoes grooves 32ᵇ which receive ribs 33ᵇ on the outer faces of the said expanding blocks, as will be understood by reference to Figs. 6 and 7 of the drawings.

By the use of my described mechanism, the more or less expensive differential gearing now commonly provided in automobiles, is rendered unnecessary, and the independent or differential action of the rear wheels is attained automatically.

Having thus described my invention I claim as new and wish to secure by Letters Patent:—

In combination with a driving shaft and a wheel thereon, a ring carried by the wheel, a plurality of shoes slidably mounted in the ring, blocks slidably interlocked with the adjacent ends of the shoes, and having rounded projections on their inner faces, a spreader carried by the driving shaft and slidably engaged with the rounded projections, said spreader being adapted to simultaneously slide the blocks and shoes, whereby the latter engage or disengage the ring.

CHARLES E. MORSE.

Witnesses:
FRANK H. ALLEN,
FRED. K. DAGGETT.